US012711282B2

(12) United States Patent
Sinangil et al.

(10) Patent No.: US 12,711,282 B2
(45) Date of Patent: Aug. 18, 2026

(54) PHYSICALLY UNCLONABLE FUNCTION CELLS WITH HOT CARRIER INJECTION

(71) Applicant: NVIDIA Corp., Santa Clara, CA (US)

(72) Inventors: Mahmut Ersin Sinangil, Los Altos, CA (US); Sudhir Shrikantha Kudva, Dublin, CA (US); Yan He, Houston, TX (US)

(73) Assignee: NVIDIA Corp., Santa Clara, CA (US)

( * ) Notice: Subject to any disclaimer, the term of this patent is extended or adjusted under 35 U.S.C. 154(b) by 15 days.

(21) Appl. No.: 18/922,001

(22) Filed: Oct. 21, 2024

(65) Prior Publication Data

US 2026/0111614 A1 Apr. 23, 2026

(51) Int. Cl.
*G06F 21/75* (2013.01)
*H03K 19/20* (2006.01)

(52) U.S. Cl.
CPC ............. *G06F 21/75* (2013.01); *H03K 19/20* (2013.01)

(58) Field of Classification Search
CPC ...... G06F 21/75; H04L 9/0866; H04L 9/3278
USPC ............................................................ 726/34
See application file for complete search history.

(56) References Cited

U.S. PATENT DOCUMENTS 9,208,355 B1 * 12/2015 Areno .................. H04L 9/0866
9,515,835 B2 * 12/2016 Mathew ................. G06Q 10/08
10,038,446 B2 * 7/2018 Mai ................. H03K 19/00315
11,750,192 B2 9/2023 Kudva et al.
11,784,835 B2 10/2023 Kudva et al.
2016/0285639 A1 * 9/2016 Mathew ................. G06Q 10/08
2017/0277898 A1 * 9/2017 Powell .................... G06F 21/53
2018/0091293 A1 * 3/2018 Suresh ................. H03K 19/003
2018/0176025 A1 * 6/2018 Suresh .................. H04L 9/3278
2019/0028284 A1 * 1/2019 Rezayee .................. H04L 9/14
2019/0165956 A1 * 5/2019 Adham ................. H04L 9/0866
2020/0210628 A1 * 7/2020 Karpinskyy ............ G06F 21/75
2021/0119812 A1 * 4/2021 Areno ................... H04L 9/0866
2022/0271752 A1 * 8/2022 Kudva ........... H03K 19/018521
2022/0271952 A1 * 8/2022 Kudva .................. H04L 9/0825

FOREIGN PATENT DOCUMENTS

CN 111310241 B * 3/2022 ............ G06F 21/73

OTHER PUBLICATIONS

He, An Automatic Self-Checking and Healing Physically Unclonable Function (PUF) with <3x10-8 Bit Error Rate, ISSCC 2021 / Session 36 / Hardware Security / 36.5, pp. 506-508.
Kudva, High-Density and Low-Power PUF Designs in 5nm Achieving 23x and 39x BER Reduction After Unstable Bit Detection and Masking, ISSCC 2024 / Session 16 / Security: From Processors to Circuits / 16.4 Pages pp. 302-304.
Liu, A 0.5-V Hybrid SRAM Physically Unclonable Function Using Hot Carrier Injection Burn-In for Stability Reinforcement, IEEE Journal of Solid-State Circuits, vol. 56, No. 7, Jul. 2021. pp. 2193-2204.

(Continued)

*Primary Examiner* — Samson B Lemma
(74) *Attorney, Agent, or Firm* — Carnelian Law, LLC

(57) ABSTRACT

Devices including an arrangement of multiple of physically unclonable function (PUF) cells organized to generate a bit pattern, and wherein the PUF cells each includes multiple inverting stages, each inverting stage configured to enable a short circuit between outputs of a pair of inverters to enable accelerated aging of one of the inverters.

18 Claims, 9 Drawing Sheets

(56) References Cited

OTHER PUBLICATIONS

Matthew, A 0.19pJ/b PVT-Variation-Tolerant Hybrid Physically Unclonable Function Circuit for 100% Stable Secure Key Generation in 22nm CMOS, ISSCC 2014 / Session 16 / SoC Building Blocks / 16.2, pp. 278-230.
Velamala , PVT Tolerant Zero Bit-Error-Rate Physical Unclonable Function Exploiting Hot Carrier Injection Aging in 7nm FinFET Technology., 2022 IEEE Custom Integrated Circuits Conference (CICC), p. 1-2.

* cited by examiner

Vout
ISOLATION CIRCUITRY
VSS
308
308
Age_EN
Age_EN
302
302
304
306
in
out
EN
val
Age_EN
Age_val
reset 414
404
412
406
boost
norm
out
age
reset
in
val
EN
BOOST CIRCUIT 408
VDD

402

PHYSICALLY UNCLONABLE FUNCTION CELLS WITH HOT CARRIER INJECTION

BACKGROUND

Physically unclonable function (PUF) cells are circuits with identical component and net structures formed such that when powered up their outputs are deliberately designed to vary in unpredictable manners due to small manufactured internal electrical device mismatches. PUF cells may be especially useful in digital security and/or cryptography to generate keys and other patterns unique to a particular device.

Accelerated aging may be applied to PUF cells to improve their output stability. One such accelerated aging mechanism utilizes bias temperature instability (BTI). BTI aging works by applying a relatively large (compared to operating conditions) electric field to the PUF cells at relatively elevated temperatures. One drawback of BTI aging is that the effects may be partially reversible, so that over time some of the stability improvement gained from accelerated aging of the PUF cells is lost.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 depicts an embodiment of an edge chasing PUF cell configured for HCI-accelerated aging.

FIG. 4A depicts an exemplary HCI inverter in accordance with one embodiment.

FIG. 4B FIG. 4A depicts an exemplary HCI-enhanced NAND gate gate in accordance with one embodiment.

DETAILED DESCRIPTION

In cryptographic applications, the stability of the outputs of a PUF cell array effects the size and complexity of the key generation logic. For example if the PUF array utilized to generate the key value for encryption or decryption has large number of cells that change values under different operating conditions, the applied error correction mechanisms grow more complex and require more circuit area.

Disclosed herein are PUF structures and aging mechanisms utilizing hot carrier injection (HCI). The HCI aging may be applied for example to edge chasing PUF structures and diode-clamped inverter chain PUF structures to achieve improved output stability. During the aging process, HCI mechanisms may maintain a current and high electric field in the channels of internal devices of the PUF cells. HCI aging may obviate some of the stability disadvantages of aging mechanisms such as HBI.

Figure 1:
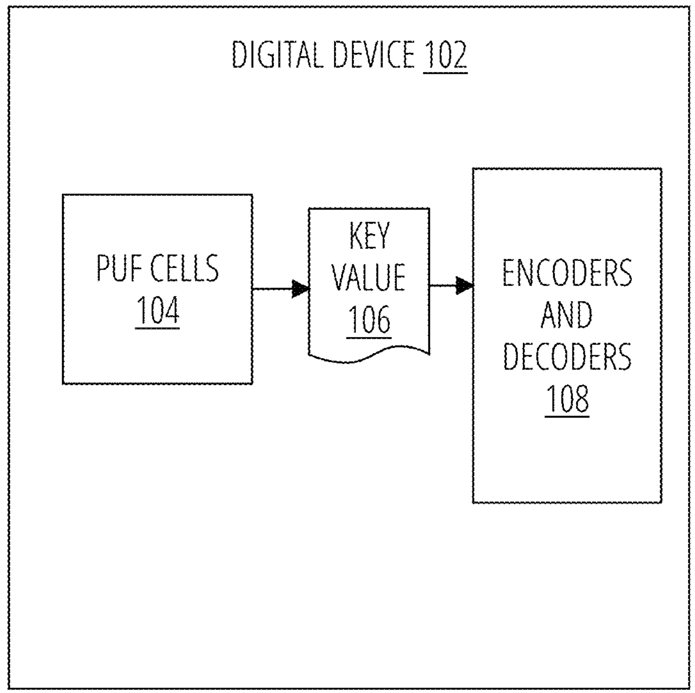
FIG. 1 depicts an example of a digital device that utilizes PUF cells to generate a key value.

FIG. 1 depicts an example of a digital device 102 utilizing PUF cells 104 to generate a bit pattern such as a key value 106 for use by encoders and decoders 108, e.g., for encryption. Some or all of the PUF cells may utilize an edge chasing and/or diode-clamped inverter chain structure as described in more detail below.

Figure 2:
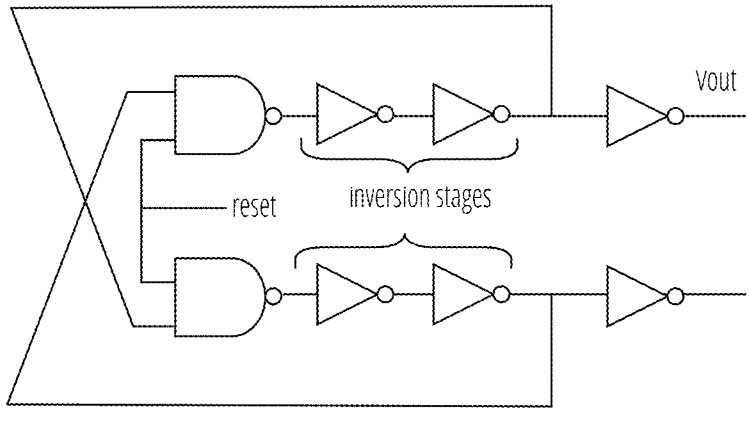
FIG. 2 depicts an edge-chasing PUF cell in one embodiment.

FIG. 2 depicts an edge-chasing PUF cell in one embodiment. At a high level, the PUF cell comprises an even number of inversion stages coupled in a ring (two inversion stages are depicted, but more may be present). When an applied reset signal transitions from low to high, two edges are injected into the ring and circulate in the ring. Due to manufacturing process variations among the internal devices, one edge circulates faster than the other. When the faster edge catches up with the slower edge the ring settles at a stable output value that is unpredictable at the macro or device level. During an enrollment phase (post manufacture and prior to deployment) a plurality of such PUF cells (herein, an "array") are powered up to their natural output states. This overall state of the PUF array is then subjected to directed and accelerated aging. During the aging process, the cells of the PUF array are configured to opposite of their natural stable state and aged.

Figures 3, 4A, 4B:
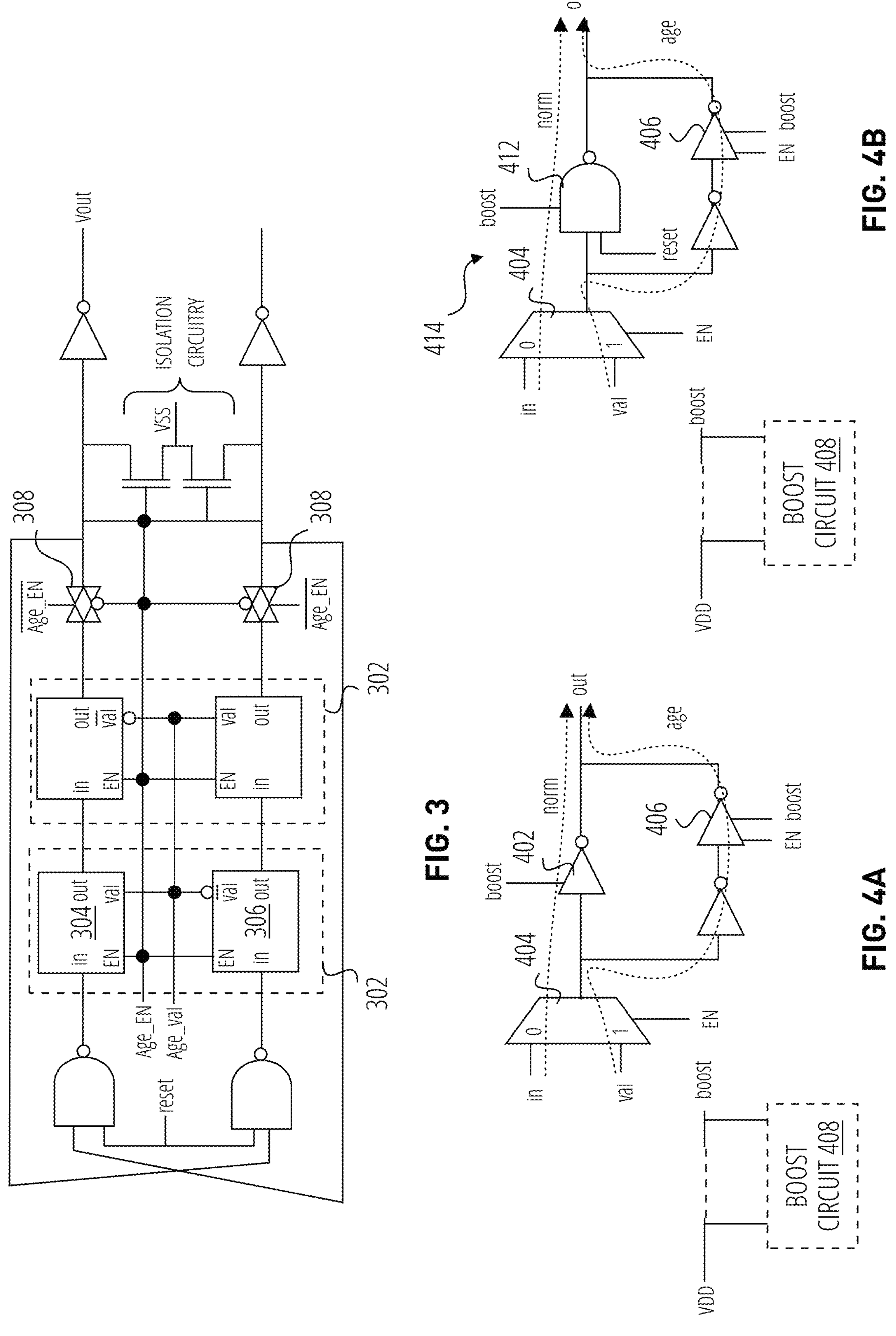

FIG. 3 depicts an embodiment of an edge chasing PUF cell configured for HCI-accelerated aging. HCI against utilizes both of a relatively high current in the channels of the aged transistors and a relatively high electric field across the gate oxide of said transistors. The high channel current and the high electric field cause high-energy carriers to be trapped in the gate oxide of the transistors, which reproduces the effects of aging.

The ring of the edge chasing PUF cell comprises an even number of inversion stages 302 (two in the depicted embodiment). Each inversion stage 302 comprises a pair of HCI inverters.

An exemplary HCI inverter is depicted in FIG. 4A. The inverter includes a selector 404 (e.g., a mux/multiplexer) configured to output to a parallel arrangement of inverters, one of which is an aging inverter 406. The parallel arrangement of inverters includes a first branch (the upper depicted branch) that includes an odd number of inverters (e.g., one inverter in the depicted embodiment), and a second branch that includes an even number of inverters (e.g., the depicted two inverters). The two branches merge at an output node of the HCI inverting stage, where, in aging mode, contention occurs between the output of the aging inverter 406 and the complementary output of the PUF inverter 402 (the inverter that is utilized in normal mode, and on which accelerated aging is performed).

Within each inversion stage, one HCI inverter 304 is configured to input (pass to internal devices) the aging signal Age_val and the other HCI inverter 306 is configured to input the binary complement of the aging signal Age_val. The edge chasing PUF cell is further configured with switches, e.g., transmission gates 308, isolation circuitry, and an aging mode enable signal Age_EN, described below.

During normal operation, Age_EN=0 and norm path depicted in FIG. 4A is selected, obviating the Age_Val input. In this mode the input in traverses through the PUF inverter 402 and the HCI inverter operates overall as a conventional inverter with the small delay of the selector 404 circuit, e.g., a mux, in the input-to-output path.

In an aging mode of operation, Age_EN=1 and the aging signal val is selected and the tri-state aging inverter 406 is also enabled. Based on whether val=0 or whether val=1, either the PMOS transistor or the NMOS transistor in the PUF inverter 402 is aged, while the other remains in the un-aged state. The aging inverter 406 receives the complement of the value that the PUF inverter 402 receives, and the output of aging inverter 406 is shorted with the output of PUF inverter 402. Each of aging inverter 406 and PUF inverter 402 may comprise P-over-N structures (PMOS header devices and NMOS footer devices, stacked in series) in various configurations known in the art.

The aging process may be fine-tuned by configuring the aging inverters 406 with transistors comprising threshold voltages different than the threshold voltages of the transistors utilized in the inversion stages 302.

The short circuit runs from the supply nodes of the inverters to the reference ground node through the PMOS device(s) of PUF inverter 402 and the NMOS device(s) of aging inverter 406 or through the PMOS device(s) of aging inverter 406 and the NMOS devices of PUF inverter 402. Depending on the value of input val, this generates a relatively high channel current and electric field in either the PMOS device(s) or in the NMOS device(s) of the PUF inverter 402, resulting in HCI aging effects.

In the aging mode of operation, the output node Vout of the PUF inverter 402 is configured to an intermediate voltage level between the supply voltage VDD and reference ground (VSS). The intermediate voltage level is determined by the relative strengths (current conduction capacity) of the PMOS/NMOS devices comprised by the PUF inverter 402 and by the aging inverter 406. This intermediate voltage is prevented from propagating to logic downstream of the PUF cell by either the selector 404 of the following inversion stage 302 or (for the final inversion stage 302 of the edge chasing PUF cell) by the transmission gates 308 and other isolation circuitry.

The depicted implementation ages the PMOS/NMOS devices in the 304, 306 of the edge chasing PUF cell. Additionally or alternatively, the NAND gate 410 of the edge chasing PUF cell may be aged by utilizing an HCI-enhanced NAND gate 412 (FIG. 4B).

The sizes (current capacities) of the aging inverter 406 and the PUF inverter 402 may be configured independently to take into account the current loads incurred during normal operation and during the aging operation.

To accelerate the aging process, the voltage applied to perform HCI aging may exceed the operating mode supply voltage of the PUF cell. The Aging mode requires higher voltage to accelerate the aging process. The PUF cell may operate during aging mode from a higher supply voltage than other circuits on the chip where it is deployed, or may operate in aging mode from the same supply as the other circuits and utilize a boost circuit 408 to increase the voltage applied for aging. The boost circuit 408 may for example be implemented as a switched capacitor voltage regulator or inductive buck-boost type regulator.

Figures 5A, 5B:
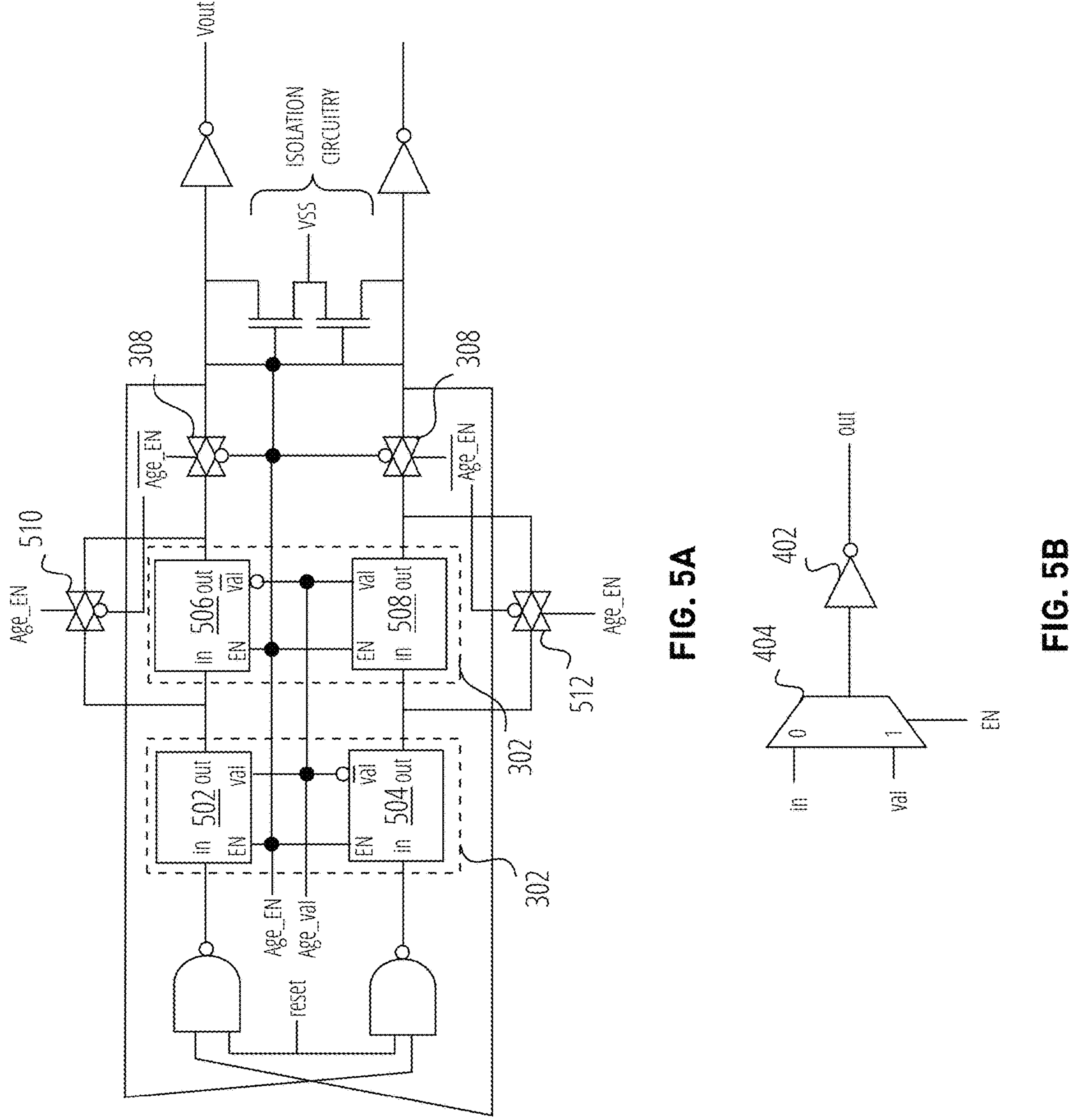
FIG. 5A depicts another embodiment of an edge chasing PUF cell configured for HCI-accelerated aging.
FIG. 5B depicts the structure of the HCI inverters in accordance with one embodiment.

FIG. 5A depicts another embodiment of an edge chasing PUF cell configured for HCI-accelerated aging. The structure of the HCI inverters 502, 504, 506, and 508 is simplified as depicted in FIG. 5B, where the output of the selector 404 is applied to a single path comprising an odd (e.g., one) number of inverters.

In this configuration, the outputs of the adjacent inverters are shorted during the aging mode. For any two adjacent inverters, if the PMOS transistor(s) of the first inverter is/are aged then the NMOS transistor(s) of the second inverter is/are aged, and vice versa. Unlike the embodiment depicted in FIG. 3 and FIG. 4A, the HCI inverters 502, 504, 506, and 508 need not utilize an aging inverter 406 to generate the large current in the PUF inverter 402 and may have the simplified structure depicted in FIG. 5B.

In aging mode, the transmission gates 510, 512 are closed to generate a short between the outputs of adjacent inverters in the edge chasing PUF cell. More generally, the transmission gates 510, 512 may be configured to generate a short between the outputs of any two HCI inverters in the edge chasing PUF cell that have opposite polarities. The appropriate configuration may be chosen based on circuit layout and routing considerations.

Although the depicted embodiments utilize four HCI inverters in the edge chasing PUF cells, more generally even longer inverter chains may be utilized, for example 8 or 12 or higher number of inverters, and the aging effect will be amplified due to the increased number of aged cells.

Figures 6A, 6B:
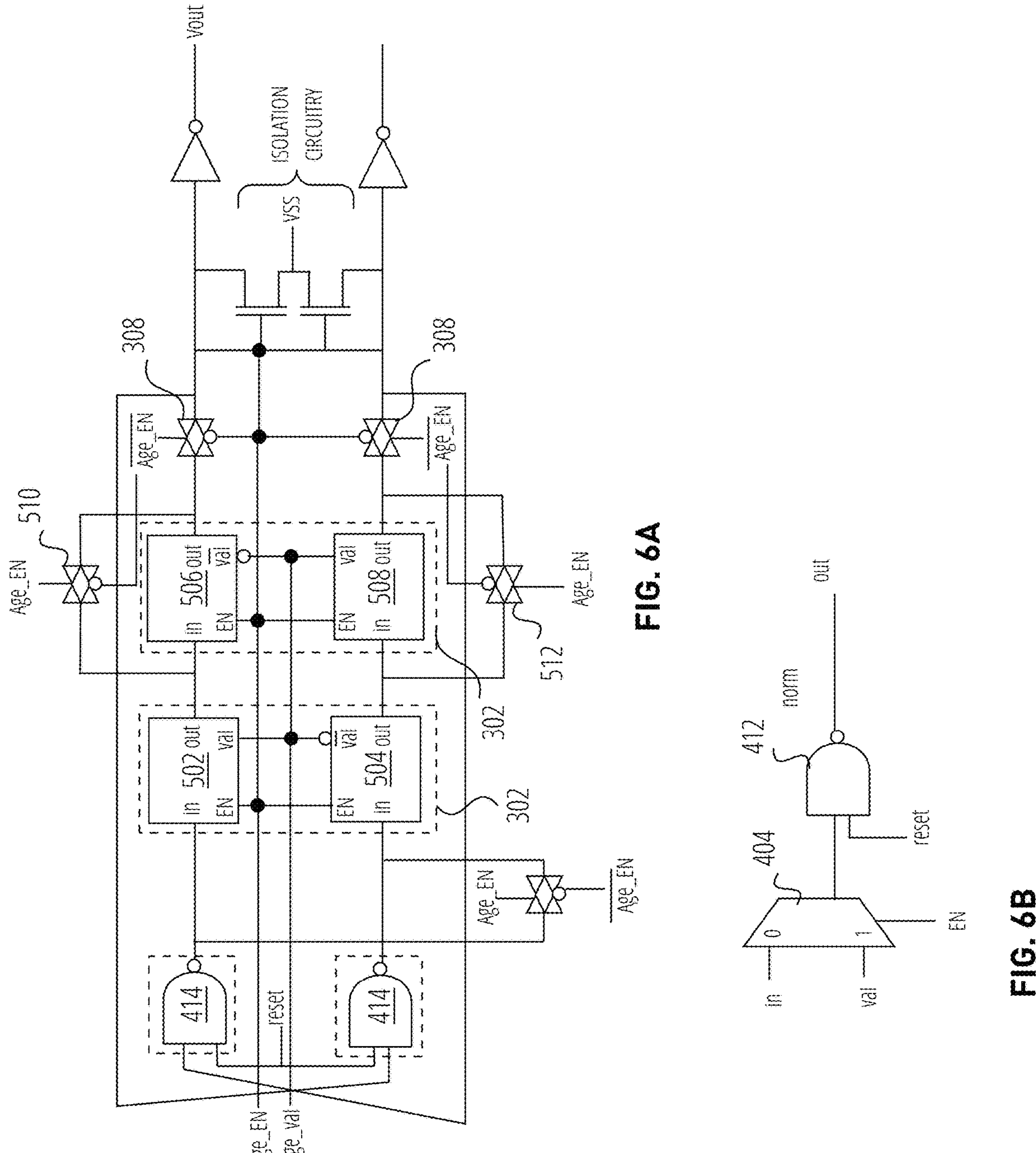
FIG. 6A depicts another embodiment of an edge chasing PUF cell configured for HCI-accelerated aging.
FIG. 6B depicts the structure of an HCI-enhanced NAND gate in accordance with another embodiment.

FIG. 5A depicts another embodiment of an edge chasing PUF cell configured for HCI-accelerated aging. A simplified alternative HCI-enhanced NAND gate embodiment that may be utilized in the circuit of FIG. 6A is depicted in FIG. 6B.

Figure 7:
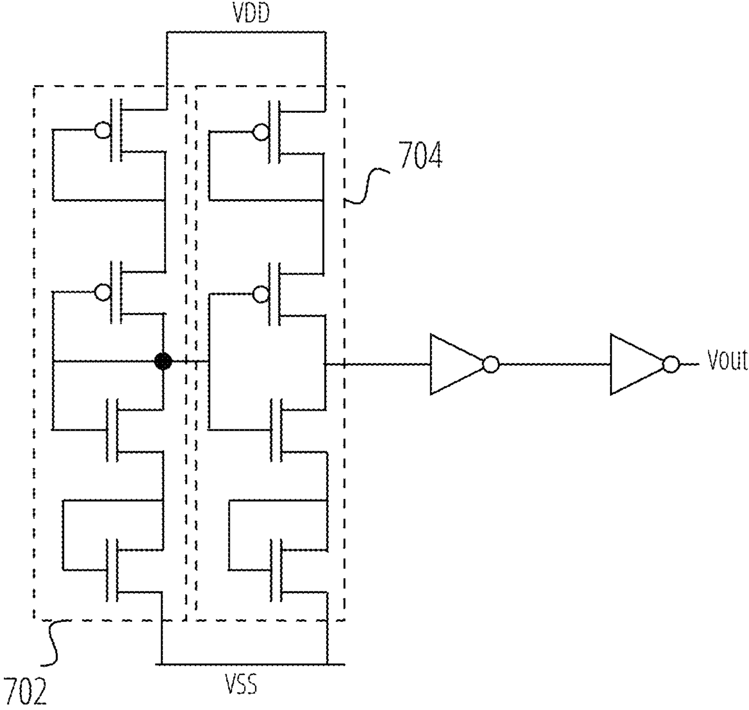
FIG. 7 depicts an embodiment of a diode-clamped inverter chain PUF cell.

FIG. 7 depicts an embodiment of a diode-clamped inverter chain PUF cell. The input and output of a first diode-clamped inverter stage 702 are shorted to set a bias of a high-gain region of a second diode-clamped inverter stage 704. Small manufacturing variations between the first and second stage cause the output of the second stage to be amplified close to digital supply rail and reference ground levels. The diode-clamped inverter chain PUF cell may be aged using mechanisms similar to those used for aging edge chasing PUF cells.

Although depicted with two stages, in practice the diode-clamped inverter chain PUF cell may comprise any practical number of such stages as called for by the implementation parameters.

Figure 8:
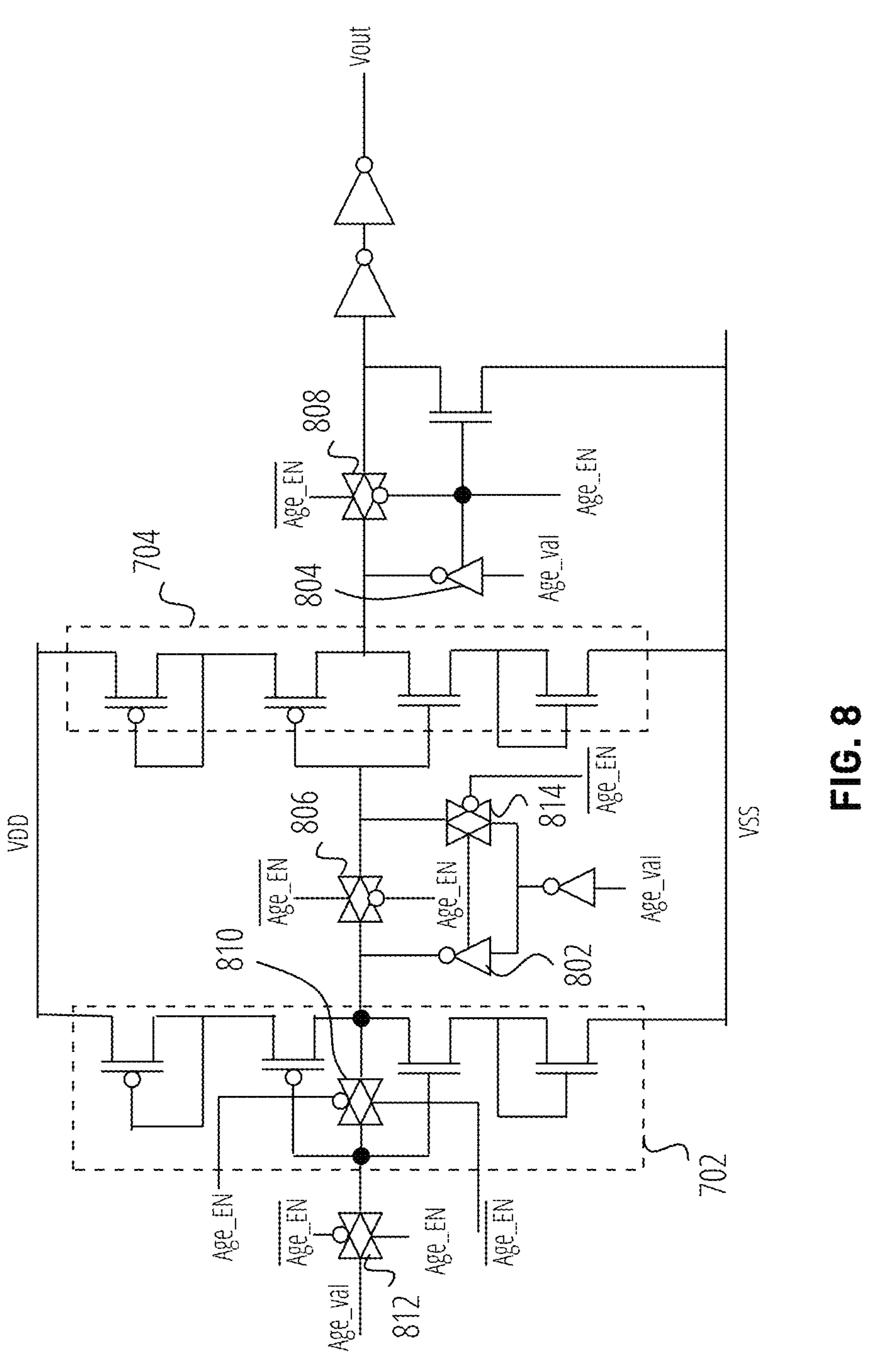
FIG. 8 depicts an embodiment of a diode-clamped inverter chain PUF cell configured for accelerated HCI aging.

FIG. 8 depicts an embodiment of a diode-clamped inverter chain PUF cell configured for accelerated HCI aging. The inputs Age_EN and Age_Val utilized to age the edge chasing PUF cell embodiments are also applied to age one or more of the diode-clamped inverters of the PUF cell.

The diode-clamped inverter chain PUF cell comprises two tri-state aging inverters 802, 804 coupled to the output of stage 702 and stage 704 respectively. During the aging mode of operation, the aging inverters 802, 804 either source or sink a large current into the respective diode-clamped inverter stages, accelerating the HCI aging of the PMOS or NMOS devices in those stages. In some embodiments the aging inverter 802 may be controlled by a transmission gate 814 and the aging inverter 804 may be controlled by a transmission gate 808.

The output of the stage 702 and the input of the stage 704 are isolated from one another by transmission gate 806 and the output of stage 704 is isolated from downstream logic by transmission gate 808.

During normal operation the input and output of stage 702 are shorted by transmission gate 810, and the aging input Age_val is blocked by transmission gate 812. To fine-tune the aging process, the sizes of aging inverter 802 and aging inverter 804 may be configured independently of the sizes of the devices in the stages 702, 704. Another mechanism to fine-tune the aging process is by configuring the aging inverters 802, 804 with transistors comprising threshold voltages different than the threshold voltages of the transistors utilized in the stages 702, 704.

Figure 9:
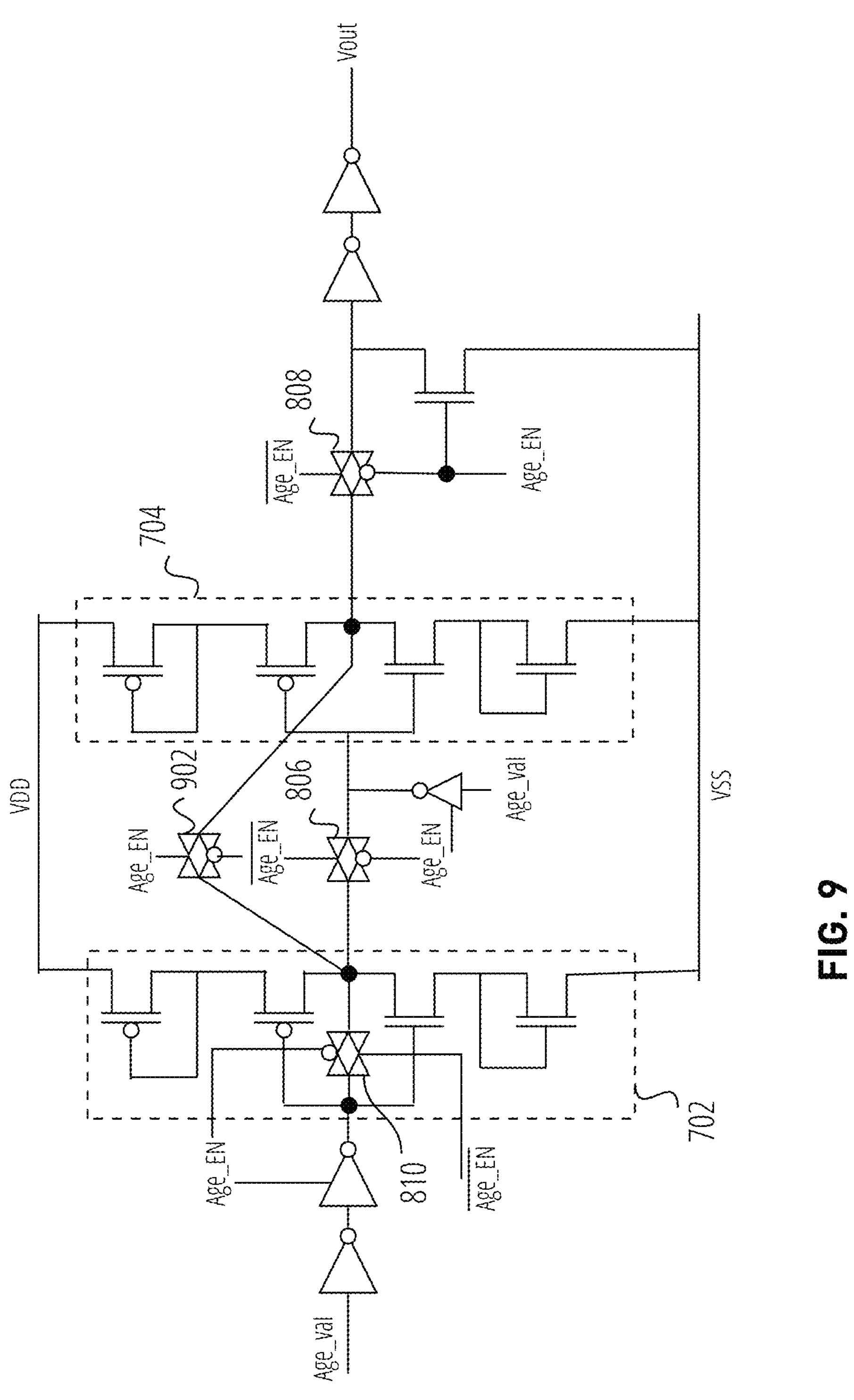
FIG. 9 depicts another embodiment of a diode-clamped inverter chain PUF cell configured for accelerated HCI aging.

FIG. 9 depicts another embodiment of a diode-clamped inverter chain PUF cell configured for accelerated HCI aging. The configuration of this embodiments is simplified over that depicted in FIG. 8 by utilizing a transmission gate 902 to short the outputs of the stages 702, 704 during aging mode, obviating the need for aging inverters 802, 804.

Figure 10:
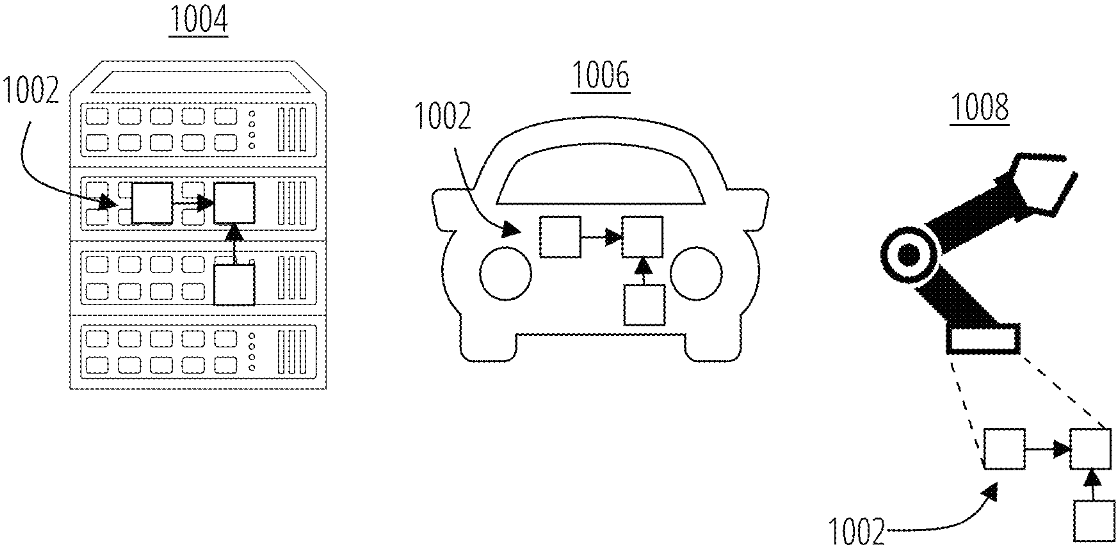
FIG. 10 depicts exemplary commercial applications of a PUF cell array 1002.

FIG. 10 depicts exemplary scenarios for use of a PUF cell array 1002 in accordance with some embodiments. A PUF cell array 1002 may be utilized in a computing system 1004, a vehicle 1006, and a robot 1008, to name just a few examples. The PUF cell array 1002 may output bit patterns to form authentication and encryption keys, for example. Generally, the PUF cell array 1002 may be utilized anywhere a bit pattern that varies unpredictably among devices is needed.

LISTING OF DRAWING ELEMENTS

102 digital device
104 PUF cells
106 key value
108 encoders and decoders
302 inversion stage
304 HCI inverter
306 HCI inverter
308 transmission gate
402 PUF inverter
404 selector
406 aging inverter
408 boost circuit
410 NAND gate
412 HCI-enhanced NAND gate
502 HCI inverter
504 HCI inverter
506 HCI inverter
508 HCI inverter
510 transmission gate
512 transmission gate
702 stage
704 stage
802 aging inverter
804 aging inverter
806 transmission gate
808 transmission gate
810 transmission gate
812 transmission gate
814 transmission gate
902 transmission gate
1002 PUF cell array
1004 computing system
1006 vehicle
1008 robot Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Logic symbols in the drawings should be understood to have their ordinary interpretation in the art in terms of functionality and various structures that may be utilized for their implementation, unless otherwise indicated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

Although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the intended invention as claimed. The scope of inventive subject matter is not limited to the depicted embodiments but is rather set forth in the following Claims.

What is claimed is:

1. A device comprising:

a plurality of physically unclonable function (PUF) cells arranged to generate a bit pattern; and wherein the PUF cells each comprises a plurality of inverting stages; wherein the plurality of inverting stages are arranged into an edge chasing circuit; each inverting stage configured to enable a short circuit between outputs of a pair of inverters to enable accelerated aging of one of the inverters; and wherein a first of the inverting stages is configured to receive an aging value and a second of the inverting stages adjacent to the first of the inverting stages is configured to receive a complement of the aging value.

2. The PUF cell of claim 1, wherein the pair of inverters that a particular one of the inverting stages is configured to enable a short circuit between is comprised by the particular one of the inverting stages.

3. The PUF cell of claim 1, wherein a first inverter of the pair of inverters is comprised by a first one of the inverting stages and a second inverter of the pair of inverters is comprised by a second one of the inverting stages.

4. The device of claim 1, wherein at least some of the inverting stages comprise a diode-clamped inverter (DCI).

5. The PUF cell of claim 4, wherein a first inverter of the pair of inverters is a first DCI and a second inverter of the pair of inverters is a second DCI.

6. The PUF cell of claim 4, comprising a transmission gate configured to enable a short circuit between an output of a first DCI and an input of a second DCI.

7. A physically unclonable function (PUF) cell comprising:

an edge chasing arrangement of inverting stages arranged into an edge chasing circuit each comprising a first inverter; and one or more of the inverting stages configured to enable accelerated hot carrier injection (HCI) aging on the first inverter by shorting an output of the first inverter with an output of a second inverter; and wherein a first of the inverting stages is configured to receive an aging value and a second of the inverting stages adjacent to the first of the inverting stages is configured to receive a complement of the aging value.

8. The PUF cell of claim 7, wherein the first inverter and the second inverter are comprised by one of the inverting stages.

9. The PUF cell of claim 7, wherein the first inverter is comprised by a first one of the inverting stages and the second inverter is comprised by a second one of the inverting stages.

10. The PUF cell of claim 7, wherein at least one of the inverting stages comprises a multiplexer configured to output to a parallel arrangement of inverters.

11. The PUF cell of claim 10, wherein the parallel arrangement of inverters comprises a first branch comprising an odd number of inverters and a second branch comprising an even number of inverters, and the two branches are merged at an output node of the inverting stage.

12. The PUF cell of claim 7, wherein at least one of the inverting stages comprises a multiplexer configured to output to a single path comprising an odd number of inverters.

13. A physically unclonable function (PUF) cell comprising:

a plurality of inverting stages arranged in an edge-chasing circuit; each inverting stage configured to enable a short circuit between outputs of a pair of inverters to enable accelerated aging of one of the inverters; and wherein a first of the inverting stages is configured to receive an aging value and a second of the inverting stages adjacent to the first of the inverting stages is configured to receive a complement of the aging value.

14. The PUF cell of claim 13, wherein the pair of inverters that a particular one of the inverting stages is configured to enable a short circuit between is comprised by the particular one of the inverting stages.

15. The PUF cell of claim 13, wherein a first inverter of the pair of inverters is comprised by a first one of the inverting stages and a second inverter of the pair of inverters is comprised by a second one of the inverting stages.

16. The device of claim 13, wherein at least some of the inverting stages comprise a diode-clamped inverter (DCI).

17. The PUF cell of claim 16, wherein a first inverter of the pair of inverters is a first DCI and a second inverter of the pair of inverters is a second DCI.

18. The PUF cell of claim 16, comprising a transmission gate configured to enable a short circuit between an output of a first DCI and an input of a second DCI.

* * * * *